United States Patent
Schmidt

(10) Patent No.: US 7,665,952 B2
(45) Date of Patent: Feb. 23, 2010

(54) HYDRAULIC LEVEL-LOADING AND DUMPING TRAILER

(76) Inventor: Bruce E. Schmidt, 5368 110th St., Holstein, IA (US) 51025

( * ) Notice: Subject to any disclaimer, the term of this patent is extended or adjusted under 35 U.S.C. 154(b) by 653 days.

(21) Appl. No.: 11/552,838

(22) Filed: Oct. 25, 2006

(65) Prior Publication Data

US 2007/0059137 A1   Mar. 15, 2007

Related U.S. Application Data

(62) Division of application No. 10/932,410, filed on Sep. 2, 2004, now Pat. No. 7,153,080.

(51) Int. Cl.
*B62B 1/00* (2006.01)

(52) U.S. Cl. .................. 414/812; 414/481; 414/482

(58) Field of Classification Search ................ 414/812, 414/481–487, 556
See application file for complete search history.

(56) References Cited

U.S. PATENT DOCUMENTS

| | | | |
|---|---|---|---|
| 2,577,246 A | 12/1951 | Hill | |
| 2,610,865 A | 9/1952 | Lee | |
| 2,807,381 A | 9/1957 | Tegeler | |
| 2,905,481 A | 9/1959 | Schramm | |
| 2,953,266 A | 9/1960 | Anderson | |
| 2,990,966 A | 7/1961 | Schramm | |
| 3,018,906 A | 1/1962 | Godfrey | |
| 3,240,506 A | 3/1966 | McMullen | |
| 3,811,697 A | 5/1974 | Armstrong | |
| 3,860,255 A | 1/1975 | Rodriguez | |
| 3,876,222 A | 4/1975 | Thorsell | |
| 4,003,583 A | 1/1977 | Stanzel | |
| 4,077,643 A | 3/1978 | Bates | |
| 4,490,089 A | 12/1984 | Welker | |
| 4,659,100 A | 4/1987 | Welker | |
| 4,673,328 A | 6/1987 | Shiels | |
| 5,228,713 A * | 7/1993 | Kovach | ................... 280/414.1 |
| 5,288,197 A | 2/1994 | Harris | |
| 5,474,416 A | 12/1995 | Rogge | |
| 5,476,274 A | 12/1995 | Oberlander | |
| 5,649,802 A | 7/1997 | Babcock | |
| 5,810,544 A | 9/1998 | Wellman | |
| 6,113,130 A | 9/2000 | Saulce | |
| 6,273,435 B1 | 8/2001 | Stringer | |
| 6,648,578 B1 * | 11/2003 | Rouse | ........................ 414/482 |
| 6,857,643 B2 | 2/2005 | Neider | |

OTHER PUBLICATIONS 6-page brochure entitled Triple L Trailers Lower—Load—Lift—Loading couldn't be any easier! by Premco Products Inc.
4-page brochure entitled Hi-Lo Rubber Torsion Hydraulic Trailers by Holstein Mfg.
1-sheet entitled Product Sales Bulletin—Escalate Trailer—by Biljax—a Member of the plettac Group.

* cited by examiner

*Primary Examiner*—Saúl J Rodriguez
*Assistant Examiner*—Willie Berry
(74) *Attorney, Agent, or Firm*—Sturm & Fix LLP

(57) ABSTRACT

A trailer, having the capability of lowering its deck to the ground surface for ease of loading and unloading from the ground; raising its deck to a loading dock height for ease of loading and unloading from a loading dock or other elevated surface; and tilting its deck for dumping is disclosed. The deck is maintained in a transport position for travel. All the changes in position may be effected by a single actuator. Rollers, affixed to a rail affixed to the deck roll inside C-channels affixed to the frame arranged at a diagonal to the vertical when raising or lowering.

6 Claims, 5 Drawing Sheets

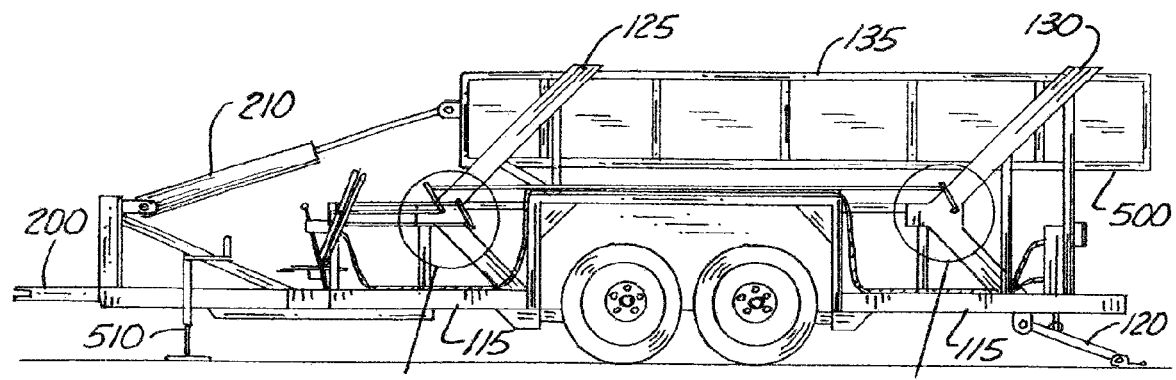
Fig. 8
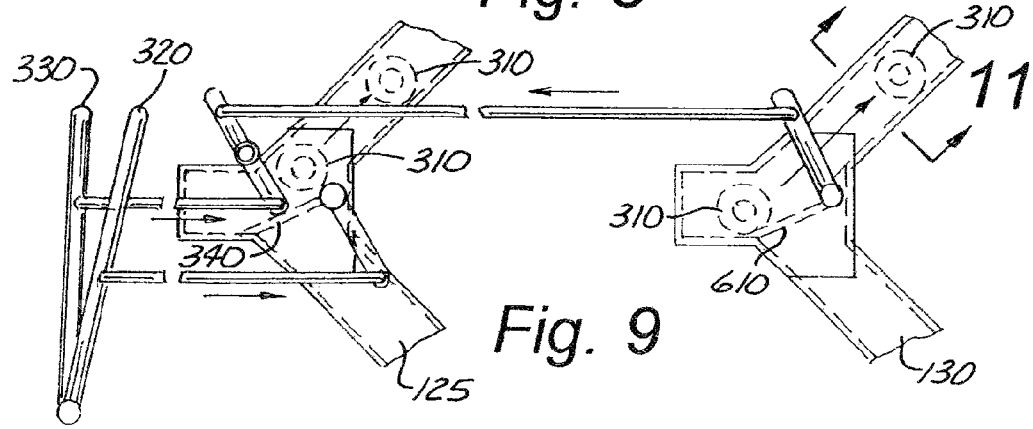
Fig. 9
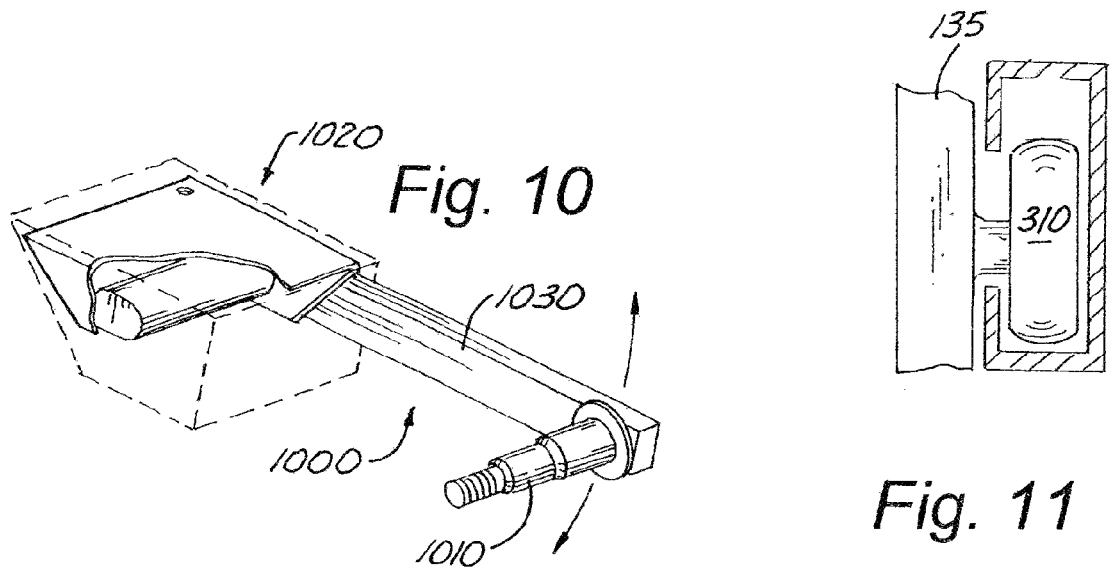
Fig. 10
Fig. 11

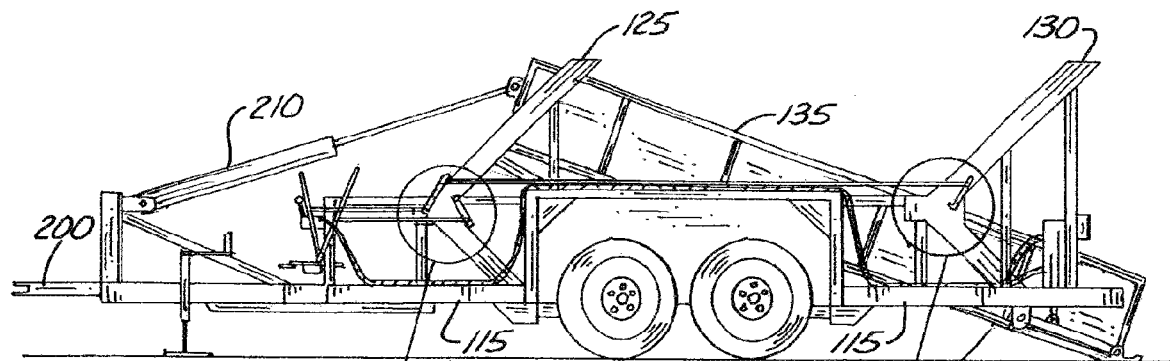
Fig. 12
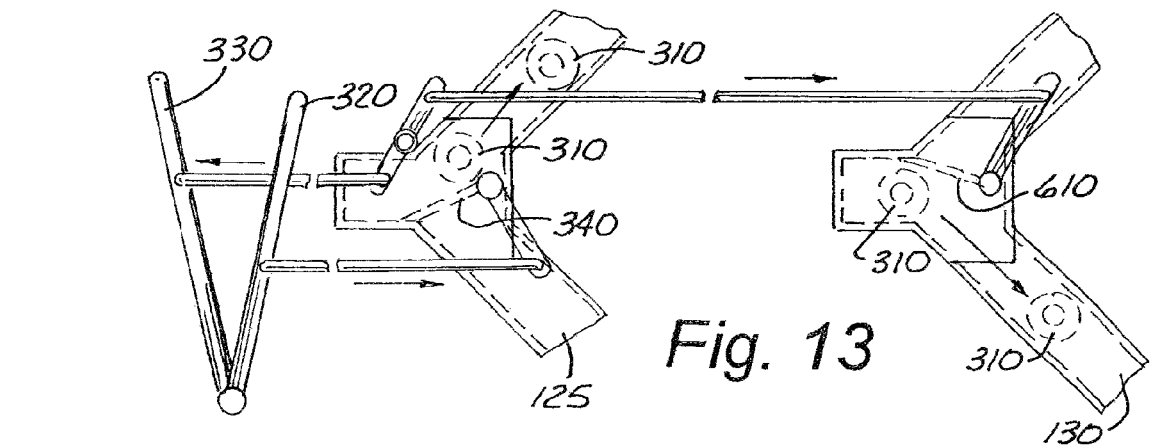
Fig. 13
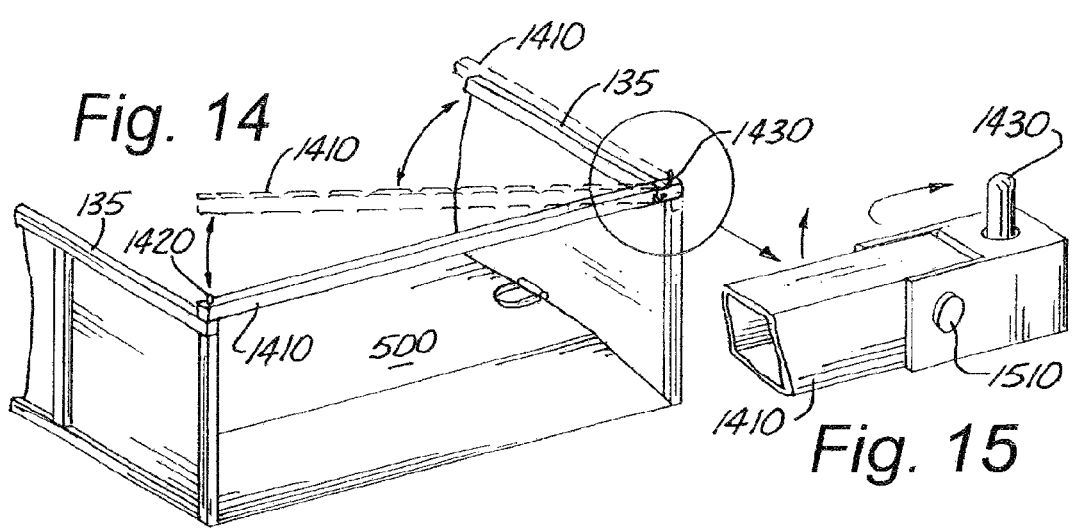
Fig. 14
Fig. 15

HYDRAULIC LEVEL-LOADING AND DUMPING TRAILER

CROSS REFERENCE TO RELATED APPLICATIONS

This application is a Divisional of U.S. patent application Ser. No. 10/932,410 filed Sep. 2, 2004, entitled HYDRAULIC LEVEL-LOADING AND DUMPING TRAILER, which is incorporated by reference herein in its entirety.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to a trailer. More particularly the present invention relates to a trailer providing dumping capabilities and having the additional capabilities of raising for level-loading and unloading at loading docks of various heights and lowering for easy loading and unloading at ground level.

2. Background Art

Trailers for hauling machinery and other cargo are commonplace. Many trailers available today provide a dumping feature, mostly for effortless unloading of loose cargo such as gravel, sand, soil, etc.

For loading and unloading machinery, commonly a machine must be driven up and down ramps to load and unload. Some trailers are made to tilt, much like the dumping feature previously mentioned, for loading and unloading. Most commonly, the cargo hauled by these trailers is fairly light, such as snowmobiles.

If a machine or other heavy cargo must be unloaded from a trailer at a loading dock, the elevation of which is much higher than the trailer deck level, significant ingenuity or a serious hoisting operation may need to be exercised to transfer the machine or cargo.

A trailer, made to adjust into a low, loading position is disclosed by Stringer in U.S. Pat. No. 6,273,435. The trailer of this patent is capable of being moved from a first or lowered position to a second or elevated position in a substantially vertical or nontilting manner. Truss-like sides, affixed to the trailer deck, provide channels engaging the trailer's frame. The frame remains at the same level relative to the axle while the deck and truss-like sides raise and lower relative to the axle. This trailer does not have a dumping capability, nor can it be raised to load or unload from a loading dock. The design of this trailer, where the truss-like sides are affixed to the deck, precludes the possibility of raising the deck significantly because the truss-like sides would be required to extend significantly below the deck, and would thus contact the ground.

There is therefore a need for a trailer that dumps, lowers into a loading position, and, raises for loading and unloading from a loading dock or other elevated location. There is a further need for a trailer having a structure for raising and lowering the deck that is rigidly affixed to the frame to which the wheels are affixed.

BRIEF SUMMARY OF THE INVENTION

A first object of the present invention is to provide a trailer, the deck of which tilts to facilitate dumping cargo. A second object of this invention is to provide a trailer deck that lowers to facilitate loading and unloading, especially, but not limited to, wheeled and tracked vehicles and machinery. A third object of this invention is to provide a trailer, the deck of which will raise to a loading-dock height to facilitate loading and unloading at loading docks and other elevated surfaces. Still another object of the present trailer invention is to provide a trailer that combines all the above objects, lending versatility to the trailer so it may be used for hauling loose cargo like gravel, sand, soil, etc., vehicles and machinery that are driven onto the trailer, and that such cargo may be loaded and unloaded at elevated locations such as loading docks.

To effect these objects, in a preferred embodiment, the trailer of the present invention is built with diagonal C-channels: a pair near the front of the trailer (front being defined as being toward the tongue used for drawing the trailer), and a pair near the rear of the trailer. (C-channel is steel channel with a cross-section shaped like a "C", typically with substantially square corners.) In the preferred embodiment, each of these diagonal C-channels is shaped like a "V" laid on its side, a lower leg of the "V" being shorter than an upper leg. The apex of the "V" is at approximately the same height as an upper rail of a railing around the trailer deck. A roller, engaging each diagonal C-channel is attached to the upper rail. In a transport position, each roller engages the diagonal C-channel near the apex. To raise a given end (front or back) of the trailer deck, the pair of rollers attached to the upper rail at that end are forced to travel along the upper legs of the diagonal C-channels at that end of the trailer. To lower a given end of the trailer deck, the pair of rollers attached to the upper rail at that end are forced to travel along the lower legs of the diagonal C-channels at that end of the trailer. Thus, one end of the trailer deck may be raised or lowered independently of the other. All adjustments to the heights of the ends of the trailer deck are carried out using a hydraulic cylinder disposed between a standard attached toward the front of the tongue and the front railing of the trailer.

Other objects, advantages and novel features of the present invention will become apparent from the following detailed description of the invention when considered in conjunction with the accompanying drawings.

BRIEF DESCRIPTION OF THE SEVERAL VIEWS OF THE DRAWINGS

FIG. 8 is a side elevation view of the trailer with the trailer deck in an upper, loading dock position.

FIG. 9 is a detail of diagonal C-channels and linkages for controlling movements of the trailer deck relative to axles of the trailer, the linkages being in a position for raising the trailer deck to a loading dock position;

FIG. 10 is a perspective detail view of a torsion axle;

FIG. 11 is a cross-sectional detail of the C-channel diagonal member with a roller disposed therein;

FIG. 12 is a side elevation view of the trailer with the trailer deck in a tilted, dump position;

FIG. 13 is a detail of diagonal C-channels and linkages for controlling movements of the trailer deck relative to axles of the trailer, the linkages being in a position for tilting the trailer deck to a dump position;

FIG. 14 is a perspective view of a rear of the trailer showing a rear restraining bar;

FIG. 15 is a perspective detail view of a hinged end of the rear restraining bar;

DETAILED DESCRIPTION OF THE INVENTION

The following is a description of the preferred embodiment of the trailer of the present invention. The invention may be embodied differently than the preferred embodiment. Details of the preferred embodiment are not to be taken as limitations to the present invention, rather, limitations are described in the claims.

Figure 1:
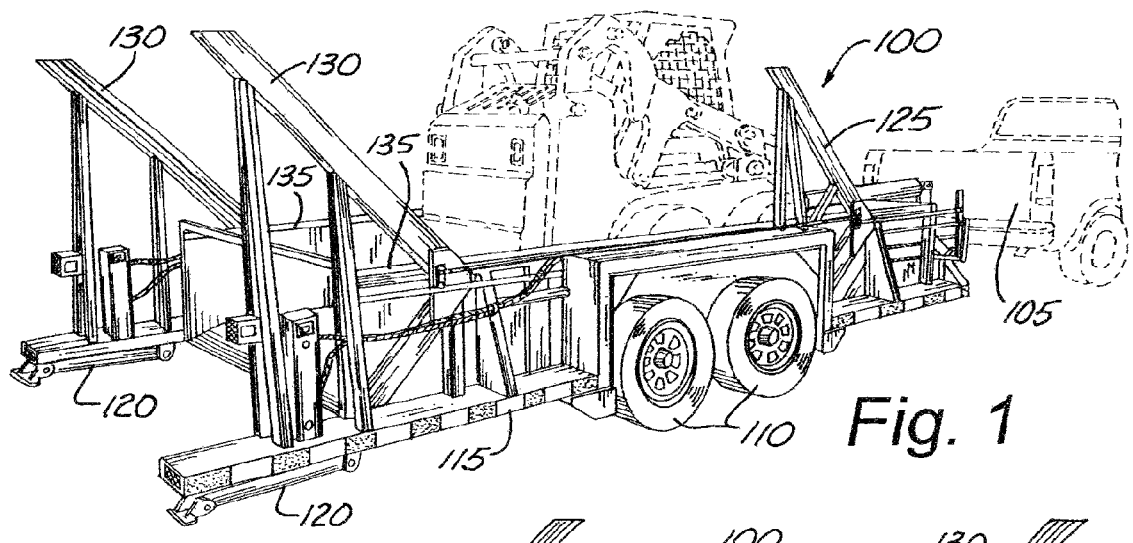
FIG. 1 is a perspective view of a trailer of the present invention carrying a skid loader and drawn by a pickup truck.
Figure 5:
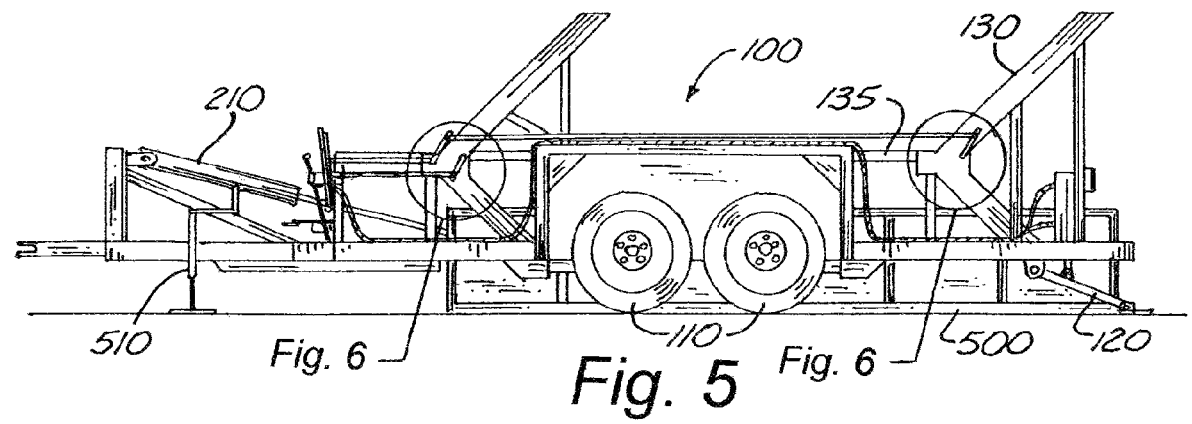
FIG. 5 is a second side elevation view of the trailer with the deck in a lower, ground loading position.
Figure 6:
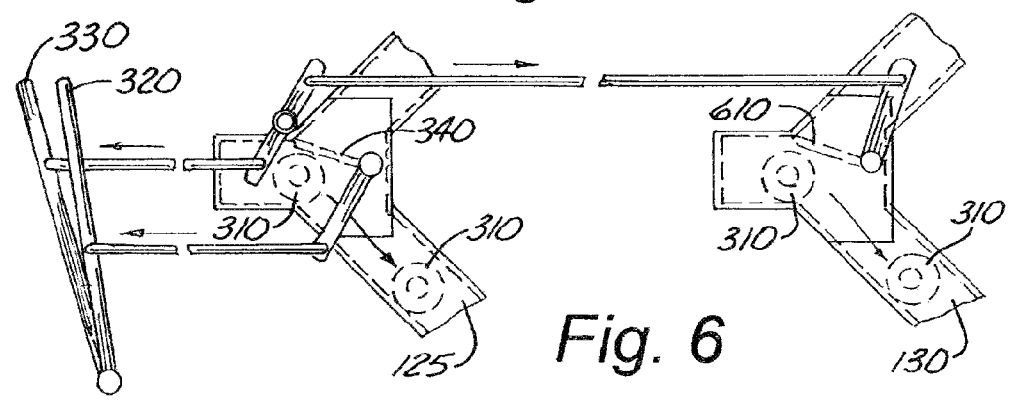
FIG. 6 is a detail of diagonal C-channels and linkages for controlling movements of the trailer deck relative to axles of the trailer, the linkages being in a position for lowering the trailer deck to the ground loading position.

The trailer 100 of the present invention is shown in perspective in FIG. 1. This trailer 100 is made to:

lower for ease of ground loading and unloading (FIGS. 5-6);

raise for ease of loading and unloading at a loading dock or other elevated surface (FIGS. 8-9); and tilt for dumping (FIGS. 12-13).

The trailer 100 is drawn by a source of motive power 105 such as the pickup truck depicted in FIG. 1. Other sources of motive power 105 are automobiles, semi tractors, farm tractors, construction equipment, etc. The present invention is not limited to a particular source of motive power 105. Indeed, a truck bed could be constructed in the manner disclosed, here, and would not be drawn as a trailer is drawn.

Figure 2:
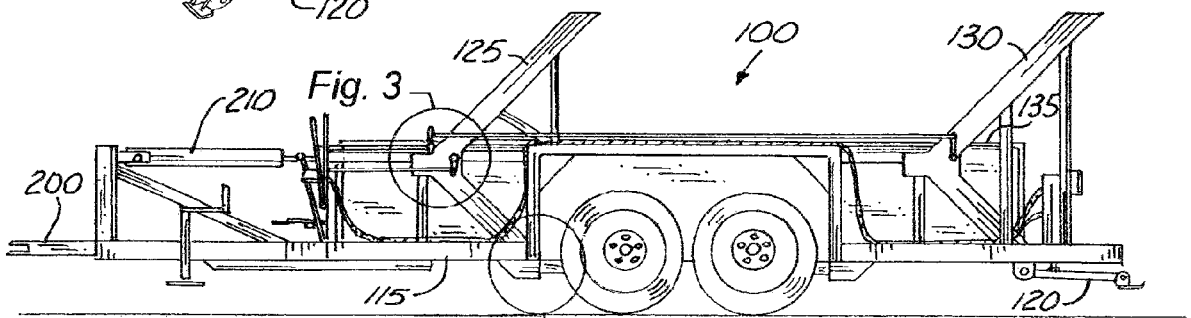
FIG. 2 is a first side elevation view of the trailer with a deck in a transport position.

In FIG. 2, a tongue 200 is clearly seen and is provided for attaching the trailer 100 to the source of motive power 105. The end of the trailer 100 on which the tongue 200 is found is defined as the front of the trailer 100. The opposite end of the trailer 100 is defined as the rear or back of the trailer 100. The forward direction of movement is defined as movement toward the tongue 200 of the trailer 100. Backward or rearward movement is defined as movement away from the tongue 200 of the trailer 100.

The trailer 100 is supported and transported on wheels 110. Although tandem axles are depicted in the figures, the present invention is not limited thereto.

A frame 115 is operatively attached to the wheels 110 via a suspension system. An example of such a suspension system is shown in FIG. 10 as a torsion axle assembly 1000. The torsion axle assembly comprises an axle 1010, a rubber torsion suspension system 1020, and a connecting lever arm 1030.

Additional support, when needed, is provided by stabilizer feet 120 mounted toward the rear of the trailer 100. The stabilizer feet 120 are especially useful when the trailer is in its loading dock position (see FIG. 8) because of the high center of gravity, but may be employed any time additional stability is needed.

Rigidly attached to the frame 115 are four diagonal C-channels. Two front diagonal C-channels 125 (only one seen in FIGS. 1 and 2) and two rear diagonal C-channels 130. The front 125 and rear 130 diagonal C-channels need not be identical.

Figure 17:
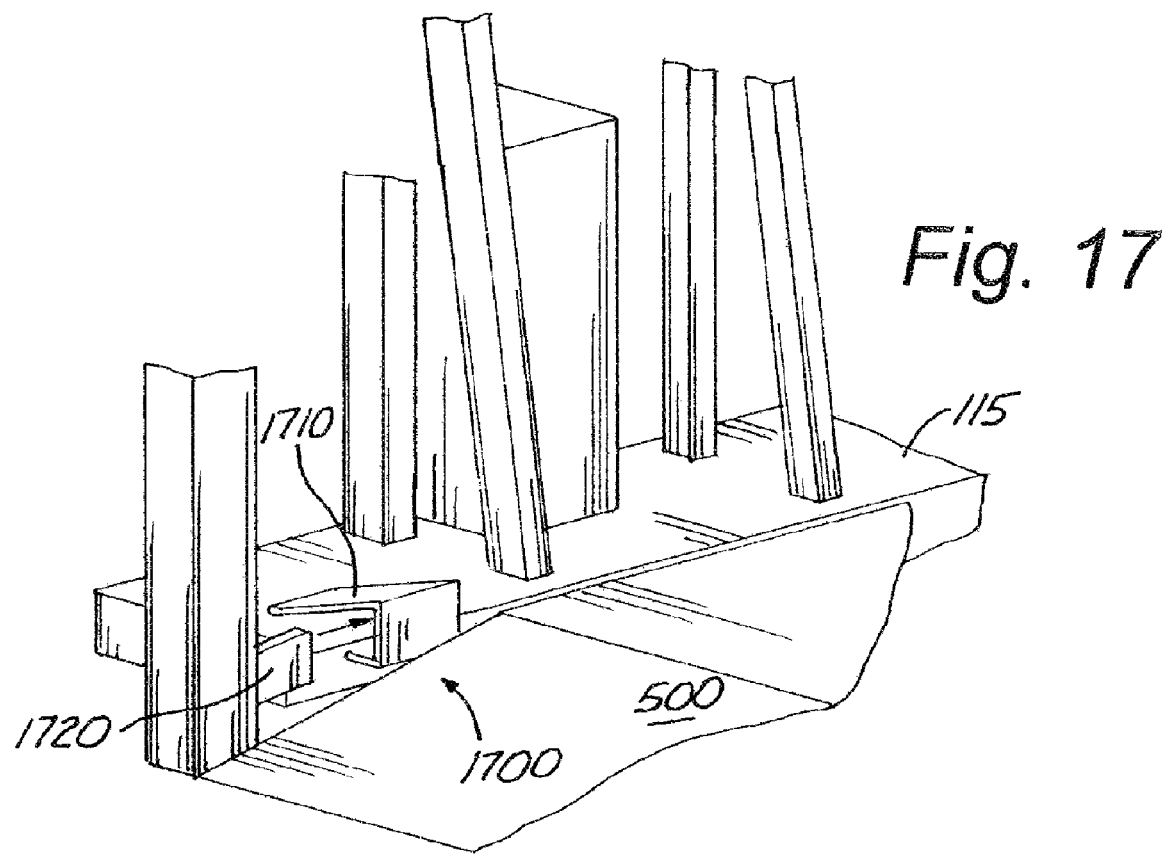
FIG. 17 is a perspective view of a locking mechanism for securing the trailer deck to a trailer frame.

Parts of the trailer 100 that move relative to the frame 115 comprise the deck 500 (see FIG. 5), and railings 135, the railings being rigidly, operatively attached to the deck 500. The deck 500 is not permanently affixed to the frame 115, but rather latches onto it with a latch assembly 1700 as seen in FIG. 17. The latch 1700 comprises two parts: a frame affixed receiver 1710 and a railing affixed insertion 1720.

Figure 3:
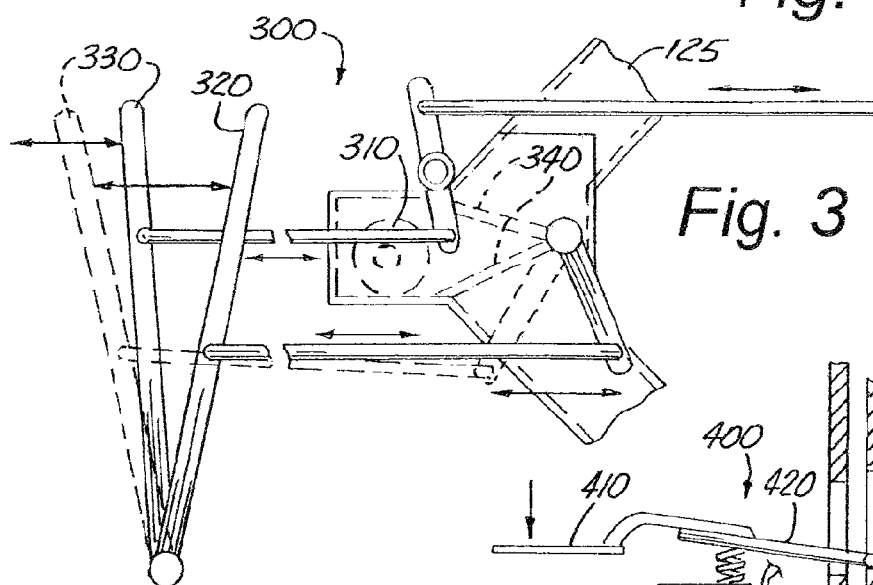
FIG. 3 is a detail of a diagonal C-channel and linkages for controlling movements of the trailer deck relative to axles of the trailer.

Viewing FIGS. 3 and 11, inside each diagonal C-channel 125, 130, resides a roller 310 that is operatively, rotatably attached to the trailer railing 135.

The trailer 100 is shown in a transport position in FIG. 2. The deck 500 is in the position most used when the trailer 100 is pulled down the road. In FIG. 3, a trailer control linkage assembly 300 is shown. A front lever 320 controls the action of the front of the trailer deck 500. A rear lever 330 controls the action of the rear of the trailer deck 500. Manipulating either lever 320, 330 controls a control flapper 340 on each side of the trailer 100. The front lever 320 controls two control flappers 340 in the front diagonal C-channels 125 while the rear lever 330 controls two control flappers 610 (see FIG. 6) in the rear diagonal C-channels 130. The control flappers 340, 610 are used to restrict the movement of the rollers 310 to the channel that will provide the action desired. There are two positions for the control flappers 340, 610: an upper position and a lower position. One control flapper 340 is shown in each of these positions in FIG. 3. When the control flapper 340 is in the upper position, the roller 310 is disallowed to enter the upper leg of the diagonal C-channel 125. Therefore, the upper control flapper 340 position is used when lowering the front of the deck 500. When the control flapper 340 is in its lower position, the roller 310 is disallowed from entering the lower leg of the diagonal C-channel 125. Therefore, this lower position is used when the deck 500 is to be maintained in the transport position and when the deck 500 is to be raised, in which case the roller 310 follows the upper leg of the diagonal C-channel 125. When moving from the upper position to the lower position the control flappers 610 are in the down position and vice versa when moving from the lower position to the upper position. The control flappers 610 at the rear of the trailer 100 are controlled in the same way as the front control flappers 340. The front control flappers 340 are manipulated independently of the rear control flappers 610 because the ends of the trailer 100 may travel in the same direction, or they may travel in opposite directions (e.g. when tilting for dumping).

Figure 4:
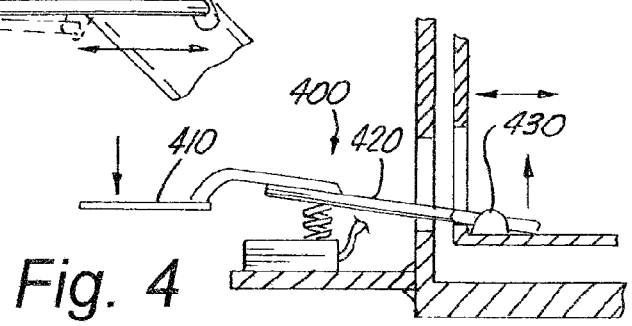
FIG. 4 is a detail of a latch for locking the trailer deck in place.

When the trailer 100 is in its transport position, a deck safety latch 400, as shown in FIG. 4, secures the deck 500 in a forward position. In order for the trailer deck 500 to raise or lower from the transport position, the deck 500 must travel backward relative to the frame 115 so that the rollers 310 can remove from the horizontal section of C-channel at the apex of the "V" shaped diagonal C-channels 125, 130 and engage one or the other of the legs of the diagonal C-channels 125, 130. The deck safety latch 400 restricts the fore-aft movement of the deck 500 relative to the frame 115. When a deck safety latch pedal 410 is depressed, the deck safety latch lever arm 420 rotates about an axis of rotation, raising the rear end of the deck safety latch lever arm 420 sufficiently high to allow a pin or other raised portion 430 to escape from a notch or hole in the safety latch lever arm 420, freeing the trailer deck 500 to move backward relative to the frame 115.

The trailer 100 of the present invention is shown in FIG. 5 with the deck 500 in its lowered, ground loading position. In this position, vehicles may easily be driven on or off the trailer 100 because the deck 500 is nearly flush with the ground or pavement. Cargo may be loaded or unloaded with a fork lift, again made easier by the very low level of the deck 500. Other cargo may be loaded more easily due to reduced lifting.

The stabilizer feet 120 (only one shown in FIG. 5) are shown in their lowered position to add stability to the trailer 100 during loading and unloading. In particular, the rear portion of the trailer 100 is less likely to tip down when the weight of the cargo is behind the wheels 110. Side to side stability is also improved when the stabilizer feet 120 are lowered. If the trailer 100 is not attached to a source of motive power 105, a jack 510 is provided to support the front end of the trailer 100 near or at the tongue.

Motive force to change the deck's 500 position is derived from an actuator 210 such as a hydraulic cylinder. When in the transport position, the actuator 210 is in a retracted position such as seen in FIG. 2. When the deck 500 is in either its upper or lower positions, the actuator 210 will be in an extended position as seen in FIGS. 5 and 8.

The detail in FIG. 6 shows how the levers 320, 330 are adjusted to permit the lowering of the deck 500. The front control flappers 340 and the rear control flappers 610 are in their upper positions, permitting the rollers 310 (operatively, rotatably attached to the railings 135) to travel down the lower leg of the diagonal C-channels 125, 130, thus lowering the deck 500 to which the railings 135 are operatively, rigidly attached. The arrows in FIG. 6 show the direction of travel of the rollers 310 during lowering of the deck 500.

Figure 7:
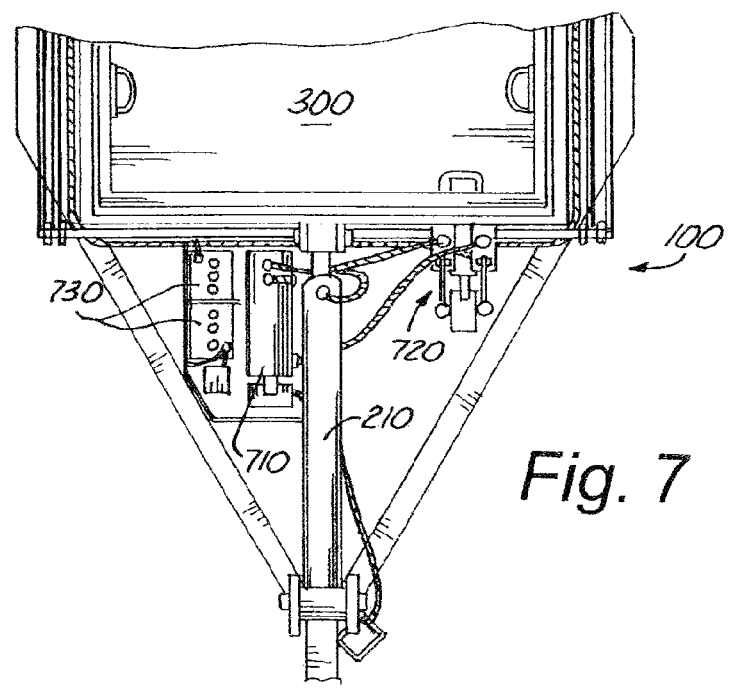
FIG. 7 is a top plan view of a tongue region of the trailer, showing a hydraulic cylinder, valving, pump, and batteries.

In FIG. 7, the front of the trailer 100 is shown from above. The actuator 210 is clearly seen in this view and is retracted into the transport position. In the preferred embodiment, the actuator 210 comprises a hydraulic cylinder. An electric hydraulic pump 710 is used to provide high pressure hydraulic fluid with which to actuate the actuator 210. A set of hydraulic control valves 720 are provided for manual operation of the actuator 210 as well as the stabilizer feet 120. Energy to operate the hydraulic pump 710 is provided by batteries 730. Through a conventional wiring for the lights of the trailer the alternator from the prime mover will charge the battery when the trailer is being transported.

The deck 500 is shown in the upper, loading dock position in FIG. 8. The stabilizer feet 120 (only one shown in FIG. 8) and the jack 510 are again shown in their lowered positions.

The detail of FIG. 9 shows how the levers 320, 330 are manipulated to permit the deck 500 to be raised to its loading dock position. The control flappers are placed in their lower position, permitting the rollers 310 to travel in the direction of the arrows into the upper leg of the diagonal C-channels 125, 130 when the actuator 210 is actuated from its retracted position (FIGS. 1 and 7) to its extended position as shown in FIG. 8.

The trailer 100 is shown in its tilted, dump position in FIG. 12. In FIG. 13, the appropriate manipulation of the levers 320, 330 is shown. The front control flapper 340 is placed in its lower position so the front rollers 310 are permitted to travel up the upper leg of the front diagonal C-channel 125. The rear control flapper 610 is placed in its upper position so the rear rollers 310 are permitted to travel down the lower leg of the rear diagonal C-channel 130. In this way, the front of the deck 500 is raised relative to the wheels 110 while the rear of the deck 500 is lowered relative to the wheels 110.

A safety bar 1410 is shown in FIGS. 14 and 15 extending between the tops of the left and right railings 135 at the rear of the trailer deck 500. The safety bar 1410 pivots on a horizontal pin 1510 so it may be raised off a first pin 1420 in order to rotate around a vertical pin 1430 to swing out of the way for loading and unloading. The entire safety bar 1410 may be lifted off both pins 1420, 1430 and removed completely, if desired.

Figure 16:
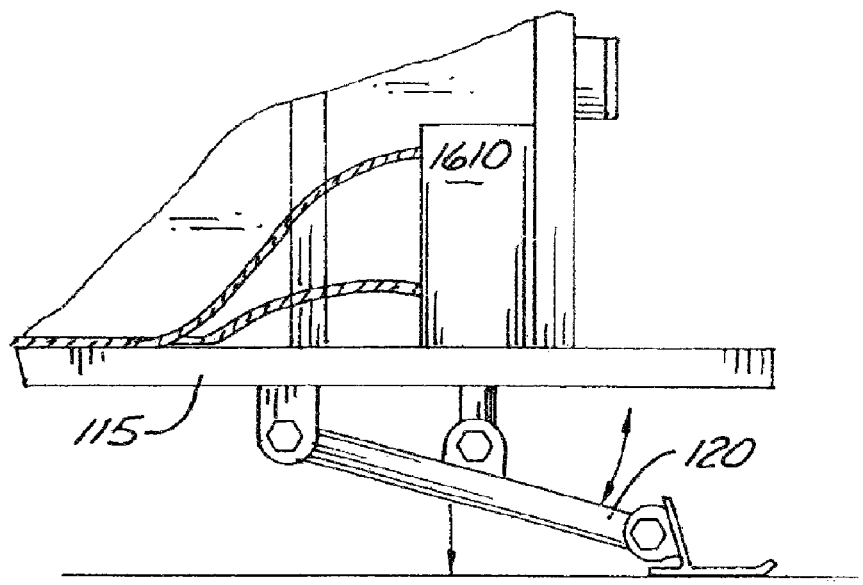
FIG. 16 is a detail of a stabilizer foot near the rear of the trailer.

A detailed view of one stabilizer foot 120 is shown in FIG. 16 in its lowered position. The stabilizer foot 120 is actuated by a stabilizer foot actuator 1610 which, in the preferred embodiment, is a hydraulic cylinder. The stabilizer foot actuator 1610 is actuated by manipulating a hydraulic control valve among the set of hydraulic control valves 720. When in its upper position, the stabilizer foot 120 is held close to the trailer frame 115 to avoid damage while the trailer is in motion.

To maintain the trailer deck 500 in its transport position and take the load off the rollers 310 when in the transport position, a latch assembly 1700 as shown in FIG. 17 is used. The latch assembly 1700 comprises two parts: a frame 115 affixed to receiver 1710 and a deck 500 affixed to insertion 1720. This arrangement is so that the frame will not spread when you turn a corner.

Note that, although not shown, the deck 500 of the trailer 100 may also be made to tip forward, that is, the front of the deck 500 may be made to lower while the rear of the deck 500 is made to raise.

The above embodiment is the preferred embodiment, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

I claim:

1. A method of providing for altering a position of a trailer deck with respect to a trailer frame, axles and wheels of the trailer being operatively affixed to the frame, diagonal tracks being operatively, rigidly affixed to the frame and rollers being operatively, rotatably affixed to the deck, said method comprising the steps of:

(a) arranging the diagonal tracks, operatively, rigidly affixed to the frame, in a vertical plane oriented parallel to a direction of trailer travel, at a diagonal compared to a vertical direction;
   (b) engaging the rollers, operatively, rotatably affixed to the deck, to the diagonal tracks;
   (c) restricting the rollers to a transport position when the trailer is transported;
   (d) rolling said rollers up the diagonal tracks above the transport position to raise the deck relative to the frame; and
   (e) rolling said rollers down the diagonal tracks below the transport position to lower the deck relative to the frame.

2. The method of claim 1, wherein the trailer additionally comprises a plurality of control flappers operatively rotatably affixed to the diagonal tracks, the method additionally comprising the step of positioning the plurality of control flappers to permit the rollers to roll only on a desired portion of the diagonal tracks.

3. The method of claim 2 wherein the step of positioning the plurality of control flappers comprises the steps of:

(a) positioning the plurality of control flappers in an upper position to disallow the rollers from rolling on an upper portion of the diagonal tracks; and
(b) positioning the plurality of control flappers in an lower position to disallow the rollers from rolling on an lower portion of the diagonal tracks.

4. The method of claim 1 wherein the trailer deck comprises a front and a rear, the method additionally comprising the steps of:
   (a) rolling the rollers near the front of the deck up the diagonal tracks above the transport position to raise the front of the deck relative to the frame; and
   (b) rolling said rollers near the rear of the deck down the diagonal tracks below the transport position to lower the rear of the deck relative to the frame, thereby positioning the deck in a dump position.

5. The method of claim 1 wherein the trailer deck comprises a front and a rear, the method additionally comprising the steps of:
   a) rolling the rollers near the front of the deck up the diagonal tracks above the transport position to raise the front of the deck relative to the frame; and
   (b) rolling said rollers near the rear of the deck up the diagonal tracks above the transport position to raise the rear of the deck relative to the frame, thereby positioning the deck in a loading dock position.

6. The method of claim 1 wherein the trailer deck comprises a front and a rear, the method additionally comprising the steps of:
   (a) rolling the rollers near the front of the deck down the diagonal tracks below the transport position to lower the front of the deck relative to the frame; and
   (b) rolling said rollers near the rear of the deck down the diagonal tracks below the transport position to lower the rear of the deck relative to the frame, thereby positioning the deck in a ground loading position.

\* \* \* \* \*